United States Patent [19]
Iavecchia et al.

[11] Patent Number: 5,227,898
[45] Date of Patent: Jul. 13, 1993

[54] NEAR REAL-TIME HOLOGRAPHIC DISPLAY FOR REMOTE OPERATIONS

[75] Inventors: Helene P. Iavecchia, Philadelphia, Pa.; Lloyd Huff, Dayton, Ohio; William T. Rhodes, Atlanta, Ga.

[73] Assignee: Computer Sciences Corporation, El Segundo, Calif.

[21] Appl. No.: 801,791

[22] Filed: Dec. 2, 1991

[51] Int. Cl.$^5$ .............................. G03H 1/08
[52] U.S. Cl. .......................... 359/9; 359/11; 358/90
[58] Field of Search .................. 359/1, 9, 11; 358/90

[56] References Cited

U.S. PATENT DOCUMENTS 3,566,021  2/1971  Jakes, Jr. ..................... 359/9
4,376,950  3/1983  Brown et al. .................. 359/33

Primary Examiner—Bruce Y. Arnold
Assistant Examiner—J. P. Ryan
Attorney, Agent, or Firm—Donald D. Mon

[57] ABSTRACT

A near-real-time holographic display for operations at a remote work site where a three dimensional database is collected with a laser range scanner. The database is then divided into discrete two dimensional segments or depth planes. A holographic recording material is then sequentially exposed to multiple depth planes through a stack of three spatial light modulators in a multiplane exposure process. This procedure is repeated for all depth planes in the database. The holographic recording material is then rapidly developed for viewing of the remote work site in a holographic image that simulates natural vision.

28 Claims, 6 Drawing Sheets

PIXEL            PIXEL
OFF STATE        ON STATE

NEAR REAL-TIME HOLOGRAPHIC DISPLAY FOR REMOTE OPERATIONS

GOVERNMENT CONTRACT DISCLOSURE

This invention was developed under a contract No. NAS 7-1036 with the National Aeronautics and Space Administration.

FIELD OF THE INVENTION

This invention relates to a holographic enhanced display of a remote site for object manipulation and more particularly relates to the generation in near-real-time of an enhanced holographic display of a remote work site.

BACKGROUND OF THE INVENTION

Currently remote site display systems use multiple two-dimensional (2-D) TV camera views during the teleoperation of remote equipment controllers. Operators of the remote equipment must fuse the multiple 2-D views and form a mental image of the 3-D space to determine the relative orientation of remote objects. During close range manipulation tasks human operators have the most difficulty in efficiently and safely controlling a manipulator. Specifically it is difficult to accurately position the manipulation tool on the end of a manipulation arm closer than a half-foot or so from the desired location and the time to complete a close-range operation can take up to 20 minutes or more. Such control difficulty is the partial result of the loss of 3-D information on flat 2-D TV screens. In a TV image, 3-D information is lost. Only monocular cues to distance are preserved such as size, linear perspective, and interposition. No binocular or accommodative cues to distance are available.

Stereographic display systems have been developed as an alternate display technology to provide the observer with binocular cues to depth through the presentation of binocularly-disparate images. In a typical system, a pair of cameras at the remote site send disparate images to each of the observer's eyes. However, the fused 3-D image can only provide the correct perspective information from a single vantage point. To create a full-parallax display, that is, one having both horizontal and vertical parallax, the observer's head must be tracked so that the remote stereographic cameras can be repositioned to correspond to the new observer viewing angle. However, head-tracking technology has not yet been sufficiently perfected so that a new head location can be acquired and a new camera location repositioned fast enough to present a smoothly-transitioning display image. That is, the display cannot meet the expectations of the human visual-vestibular system and motion sickness symptoms can result while viewing the stereographic display. It would be advantageous if a system could be provided that could achieve a full-parallax, three dimensional (3-D) display with binocular as well as accommodative cues to depth that are similar to natural vision.

It is therefore one object of the present invention to provide holographic display of a remote operations site in near-real-time.

Still another object of the present invention is to provide a full-parallax holographic display of a remote operation site that simulates natural vision.

Another object of the present invention is to provide holographic display of a remote operations site by generating a holographic image of the remote site from a database created with a laser range scanner.

Still another object of the present invention is to provide holographic image of a remote operations site from a multiplane exposure method.

Yet another object of the present invention is to generate holographic image of a remote operations site from multiple depth planes derived from a laser range scanner database.

BRIEF DESCRIPTION OF THE INVENTION

The purpose of the present invention is to provide a full-parallax, 3-D display of a remote operations site to assist an operator in efficiently and safely controlling a remote manipulator.

The system of the present invention provides a display in near-real-time that simulates natural vision. The system generates a three-dimensional (3-D), full-parallax holographic snapshot of objects at a remote work site to allow an operator of a remote equipment controller to rapidly determine the relative orientation and location of remote objects during close-range manipulation tasks. Once the holographic snapshot is generated, the display image is continuous and the observer, or equipment operator, can change viewpoint without the requirement to update the display to gain the correct perspective view. The inherent full-parallax capability of the holographic display system offers substantially shorter performance time, improved safety, and expansion of remote operations to close-range tasks that would normally require direct human control. The system is particularly useful for remote handling operations in space or in hazardous environments.

A 3-D numerical representation or database of a remote site, including an object at the remote site within the scanning field of a laser range scanner. A laser range scanner collects three dimensional numerical data representing surface points of objects at the remote site that is stored as a database. The database serves as the source of the display or image to be recorded. The numerical database is first divided or "sliced" into multiple two dimensional (2-D) image planes with each 2-D plane representing the surface points at a unique depth position. The number of image or depth planes selected determines the image quality or resolution and the length of time to generate and update an image. The time required to generate a holographic image can be from a few minutes down to a fraction of a minute depending upon the number of depth planes used. The more depth planes used the better the resolution and the longer the time to generate the holographic image.

The database is segmented into depth planes which will be subsequently displayed on a stack of spatial light modulators to create the hologram as follows. The laser camera is a line scanner that generates for example an array of 256 YZ points for a given X. To collect a three dimensional database the laser scanner is repositioned to a new X location until all lines-of-interest are scanned. For each line scanned the laser camera for example transmits the X value associated with a line, 256 Y points, 256 Z points as well as the intensity for each YZ point. The Y value can range from a minus 128 to a plus 128. The Z value, or depth location can range from 0 to 4096. The intensity can vary from 0 to 255. The values associated with each scanned line represent a two dimensional (2-D) cross-section of the three dimensional (3-D) space. A sequence of two dimensional cross-sections or line scans, comprise the three dimensional numerical database needed by a central computer control system to generate the holographic image.

Once collected the three dimensional database is segmented into XY planes for each Z-dept plane. The number of Z-depth planes is dependent on the depth resolution of the laser range scanner. These planes are then processed to create a smaller number of XY planes equal to the number of spatial light modulator (SLM) images to be recorded on a holographic recording material (HRM). The user has the option to skip specific XY planes in the original database or to use all information in the database. If all information is to be used the segmented depth planes must be compressed into a smaller set of XY depth planes. For example, assume the segmented depth planes are grouped into about 51 regions. If the database consisted of 4096 XY planes, for example, then there would be approximately 80 depth planes assigned to each of the 51 groups. The 80 depth planes in each group are then compressed into one depth plane by projecting the volume within each region into an XY plane. Each compressed depth plane contains the surface points of objects at the remote work site for a given region of depth. The extent of this region defines the effective depth resolution of the holographic display. If the original segmented depth planes in the database comprise a given depth, say six inches, then if the database is compressed into fifty one depth planes the depth resolution of the final holographic display is approximately about 0.1" (3 mm). Each compressed depth plane is then electronically transmitted by the central computer system to a SLM stack. When a depth plane is displayed on an SLM the open SLM pixels visually portray the surface points for that particular depth region. The depth planes are transmitted in groups of three to a stack of 3 SLM's. This SLM stack is then repositioned and a second group of three depth plane images transmitted to the stack. The first set of three depth plane images are electronically transmitted with the SLM stack at the end extent of its travel via movement of a micropositioning table on which the SLM stack is mounted. Laser light is then transmitted to the SLM stack by opening the shutter and the image patterns on the SLM stack are exposed on the holographic recording material (HRM). The table is then repositioned and the next set of three planes is transmitted to the SLM stack for exposure onto the HRM. This multiplane, multiple exposure process is completed until all depth planes are recorded. When all depth planes are recorded the HRM is developed by exposure to an ultraviolet (UV) light bath when the preferred photopolymer film is used as the HRM.

The holographic image is generated by sequentially transmitting the depth planes or "slices" to a plurality of spatial light modulators (SLM) which serve as the object source of the hologram. The depth slices are recorded on a near-real-time holographic recording material in a multiplane-by-multiplane fashion (i.e. 3-SLM-stack by 3-SLM-stack) until the entire volume of the selected remote work site is recorded. A stack of three SLM's is preferred. The recording material can be a photopolymer or thermoplastic holographic recording medium or any holographic recording medium that has very short development and exposure time requirements. Processing times of milliseconds are desired to meet the image generation requirements of fractions of a minute.

An optical system relays the SLM images to the holographic recording material and to the observer for viewing. To record each depth plane or slice at the correct location within the holographic depth, the three SLM stack is mounted on a micropositioning table and is appropriately positioned in depth prior to each exposure. Following multiple exposure of all images, the recording material is rapidly developed by a heating process for a thermoplastic medium or through an ultraviolet (UV) bath for a photopolymer. The developed, enhanced holographic image is then viewed by switching to a mirror that replaces the three SLM stack.

The above and other novel features and advantages of this invention will be fully understood from the following detailed description and the accompanying drawings, in which:

DETAILED DESCRIPTION OF THE INVENTION

Figure 1:
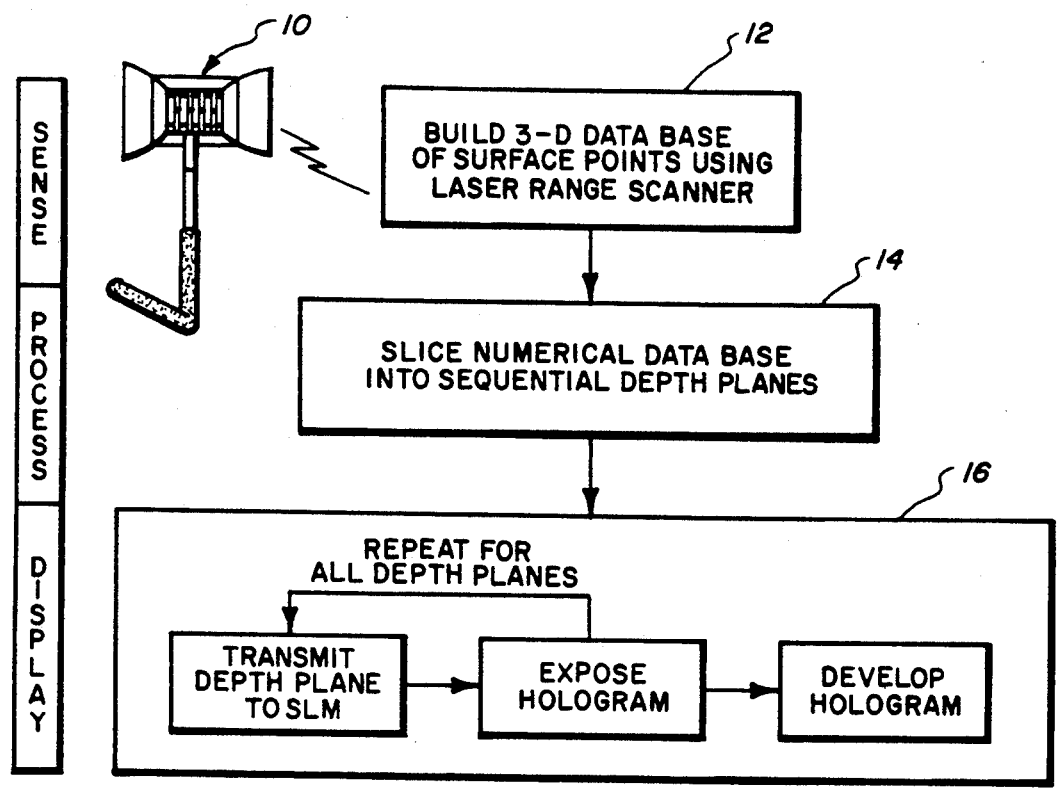
FIG. 1 Is a block diagram illustrating a three-Step process to generate a holographic image of a remote work site.
Figure 2:
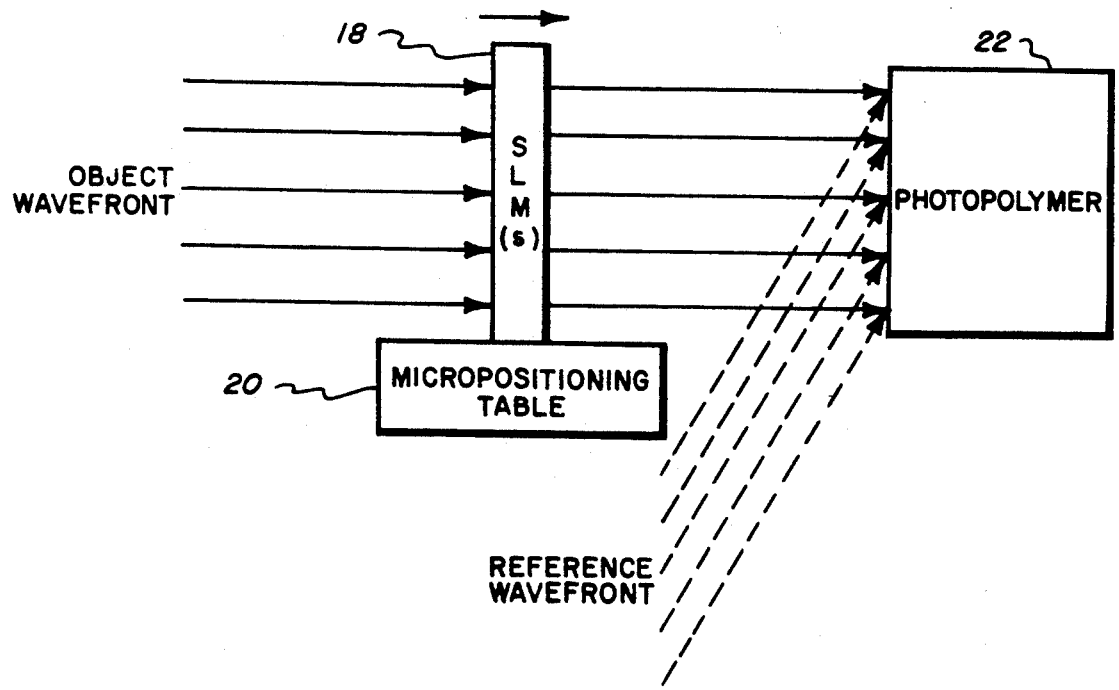
FIG. 2 is a diagram illustrating a multiplane-by-multiplane image exposure method.

The near-real-time holographic imaging system for a remote work site uses a three step process as illustrated generally in the block diagram of FIG. 1. In the first step 12 three dimensional (XYZ) surface points of a remote work site 10, including any objects, are collected to build a 3-D database using a conventional laser range scanner. In the second step 14 the numerical data base is divided or "sliced" into two dimensional (2-D) depth planes. If the user specifies a particular slice thickness then each 2-D depth plane contains the surface points of objects in a unique region. That is, all surface points in the selected region of depth are compressed into one 2-D plane. Third, the 2-D image planes are exposed onto a near-real-time holographic recording material (HRM), such as a photopolymer, using a multiplane exposure process as shown in FIG. 2. Specifically, for any single exposure of the HRM, a set of three 2-D planes are transmitted to a stack of three computer-addressable spatial light modulators (SLM). The SLM-stack acts as the "coherent" object source for the hologram. Sets of images are sequentially transmitted to the SLM stack and the HRM is multiply exposed until all depth planes are recorded. Once all depth planes are recorded, the photopolymer is instantly developed with an ultra-violet (UV) bath.

Figure 9A:
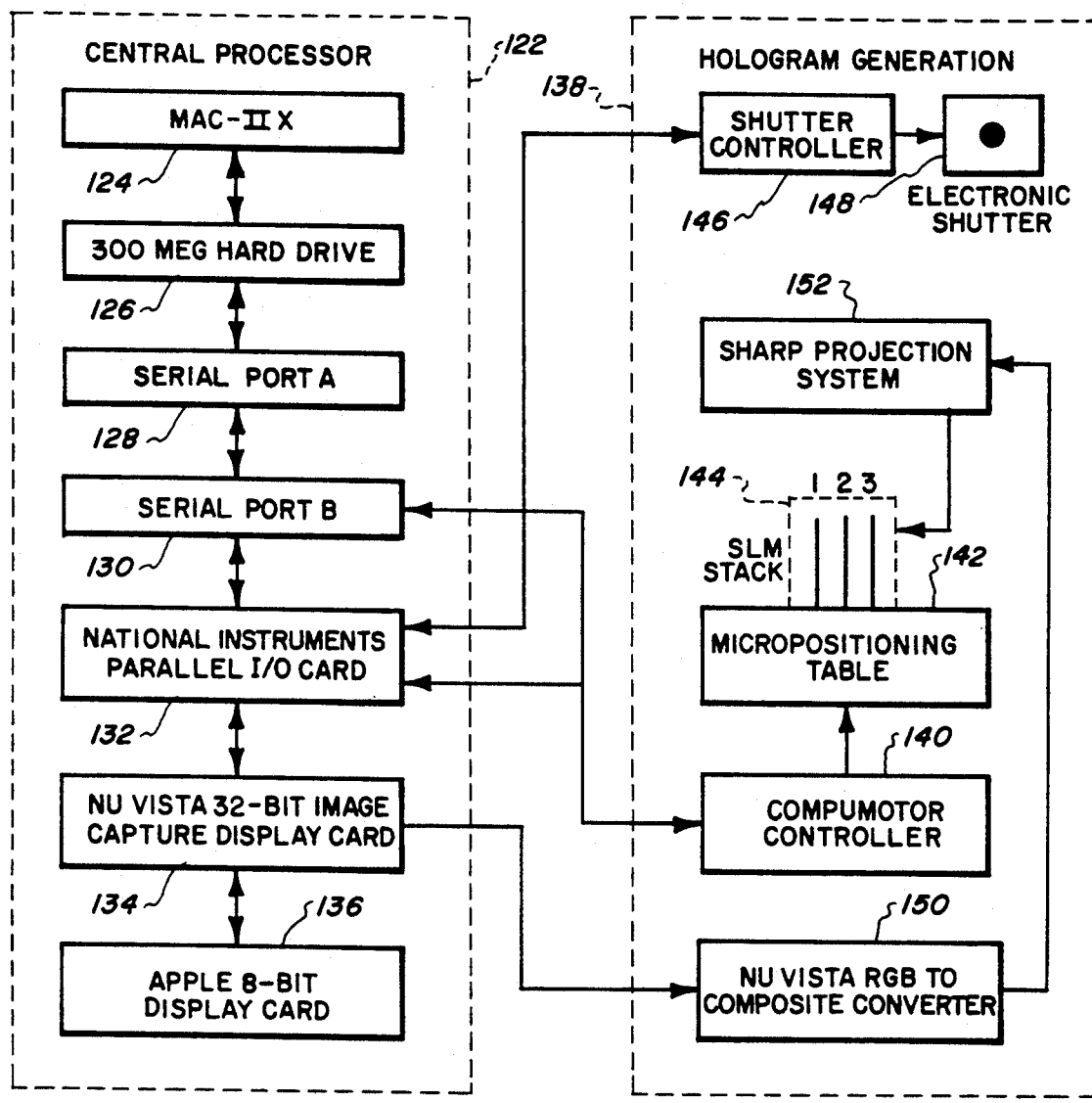
FIG. 9a is a block diagram illustrating the components of the holographic image generating system for remote operations.
Figure 9B:
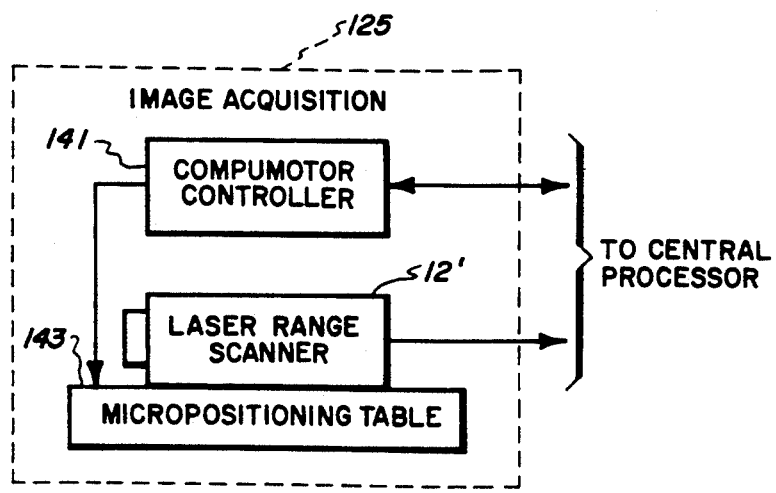
FIG. 9b is a block diagram of the remote site image capture and database collecting system.

The laser range scanner for collecting data to build a 3-D database 12 uses an active illumination process to measure 3-D surfaces. A laser projects a point of light onto the object at a particular angle to the x-axis. That point of light is reflected from the object and is imaged onto a detector such as a photomultiplier tube or a CCD camera. The output of the detector, combined with the current projection angle, is then used to determine (x,y,z) points on the object surface. At some cost to acquisition time, most scanners use linear CCD arrays and thus only operate on a single line of points at a time. Thus, to obtain a full (x,y,z) data base of an object, the scanner is used in conjunction with a positioning table 143 as shown in FIG. 9b for each line of data collected. The Jupiter Camera manufactured by Servo-Robot, Inc., of Boucherville, Quebec, is suitable for use as the laser range scanner. The Jupiter Camera uses an auto-synchronized scanning procedure and a triangulation technique to determine the surface points of objects. Because the Jupiter is a line scanner, collecting a data base requires the use of a one-axis positioning table. The Jupiter system can acquire a data base with a resolution of 0.1 inches (3 mm) in a few seconds.

Figure 3:
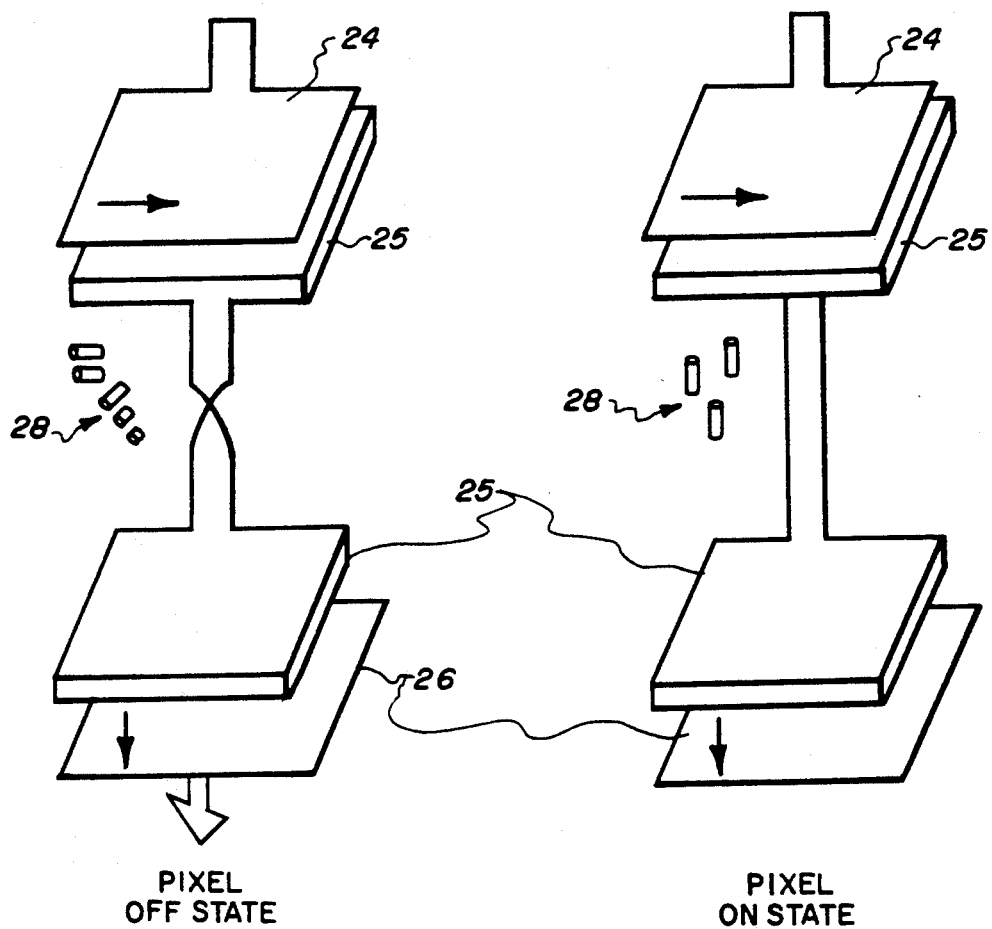
FIG. 3 is a diagram illustrating the operation of spatial light modulators.

The SLM employed by the holographic imaging system is a thin-film-transistor liquid crystal display (TFT-LCD). Individual LCD pixels are controlled by an active matrix of electrodes deposited on a glass substrate. FIG. 3 illustrates the operating principle of a typical TFT-LCD for control of a single pixel. In the off state, polarized light entering a pixel through front polarizer 24 will be rotated 90° by the action of the liquid crystal director. This will allow light to the transmitted through rear polarizer 26 which is crossed relative to front polarizer 24. In the on state, liquid crystal molecules at 28 align with the electric field included by electrodes. As a result, light entering the pixel will not be rotated and the exit polarizer (or analyzer) will absorb the light. Thus, in the off state, a pixel appears lighted while in the on state, the pixel appears dark. Pixel grey scale can be controlled by the voltage applied to the liquid crystal. A suitable TFT-LCD is manufactured by Sharp Electronics Corporation, Mahwah, N.J. for the SharpVision XV100 Projection TV for use as the SLM's.

Preferably the holographic recording material is a photopolymer which is a light-sensitive material that can be used to produce high-efficiency, near-real-time, phase holograms without the requirement for wet processing. The material consists of a mixture of several ingredients including polymeric binder, photoinitiator system, polymerizable monomers, and sensitizing dye. When the photopolymer is exposed to light (assuming a sufficient activation energy), monomer polymerization is initiated. In the exposed regions, the monomer is converted to a photopolymer. Monomers then diffuse from adjacent regions creating density gradients. As exposure continues, the originally viscous material hardens and further hologram recording is stopped. Final illumination of the material with UV light polymerizes the remaining monomer and fixes the image. Further archival quality processing requires an additional baking step. This step is not considered necessary for a near-real-time holographic recording process. The photopolymer is preferably a HRF-700 Series photopolymer manufactured by E. I. DuPont de Nemours & Co., Wilmington, Del. Optimum exposure energy for this material varies between 15 to 80 $mJ/cm^2$.

The system uses a phase conjugate optical system that is based on the principles of phase conjugation and reverse ray tracing. Phase conjugation was incorporated into the design to remove image distortions induced by the optics during hologram generation. These distortions are removed during the phase conjugate reconstruction when the light that rear-illuminates the hologram is transmitted through the optical system in a reverse path to the observer for viewing. Furthermore, this configuration provides a one-to-one correspondence between the size of the SLM image and the size of the HRM.

Figure 4:
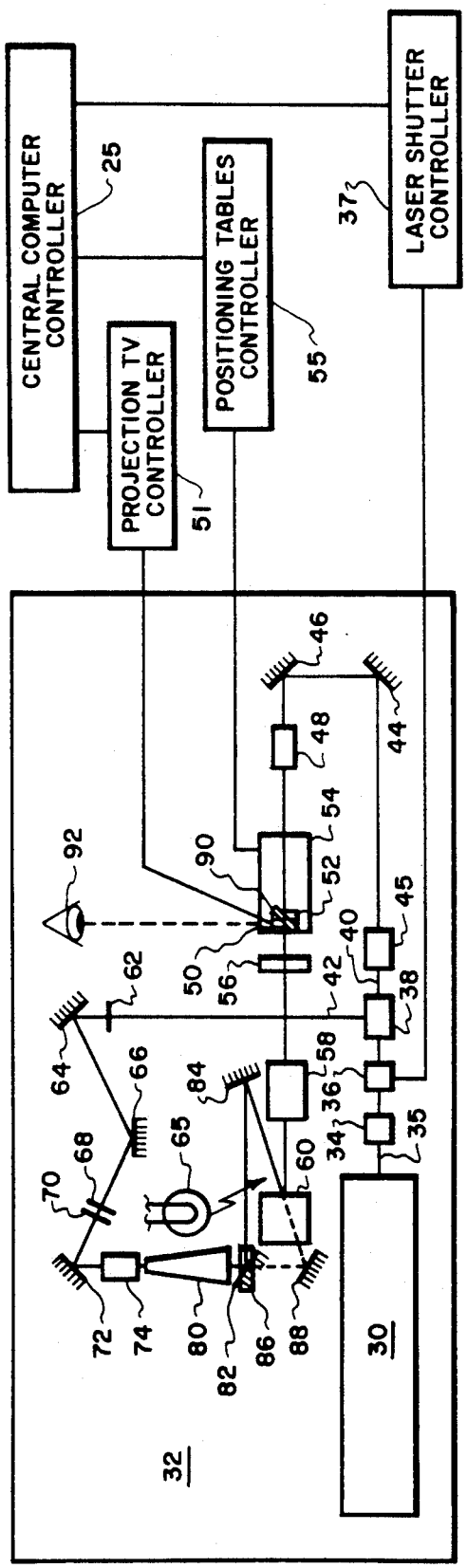
FIG. 4 is a semi-schematic diagram illustrating the configuration of optical components of a near-real-time holographic imaging system according to the invention.
Figure 5:
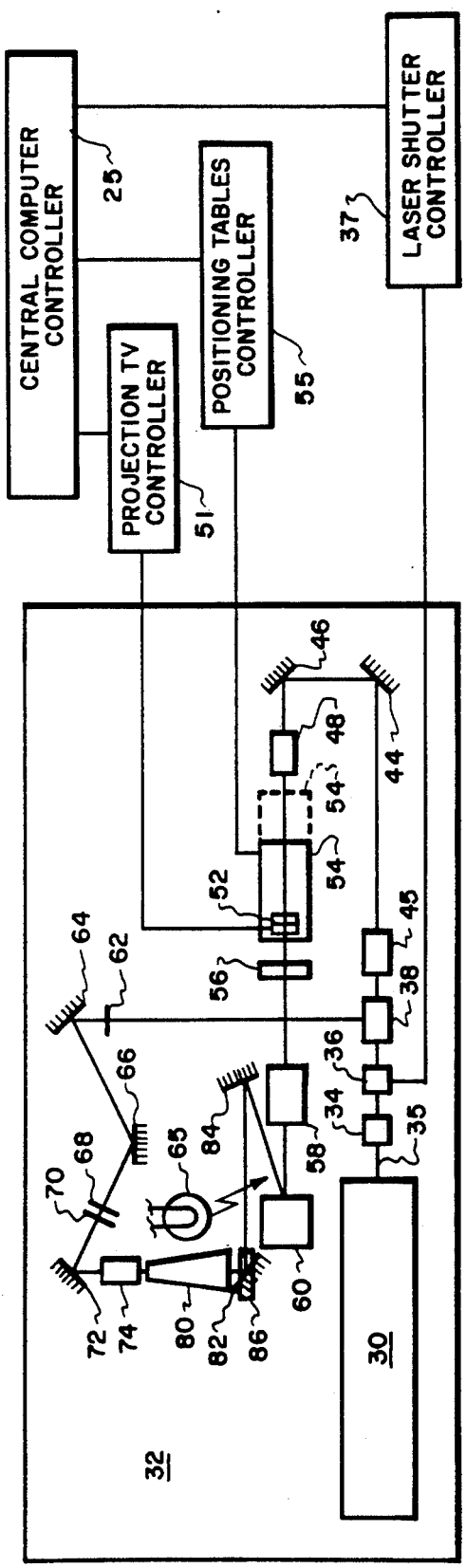
FIG. 5 is a semi-schematic diagram illustrating the configuration of optical components of a near-real-time holographic imaging system for generating a hologram.
Figure 6:
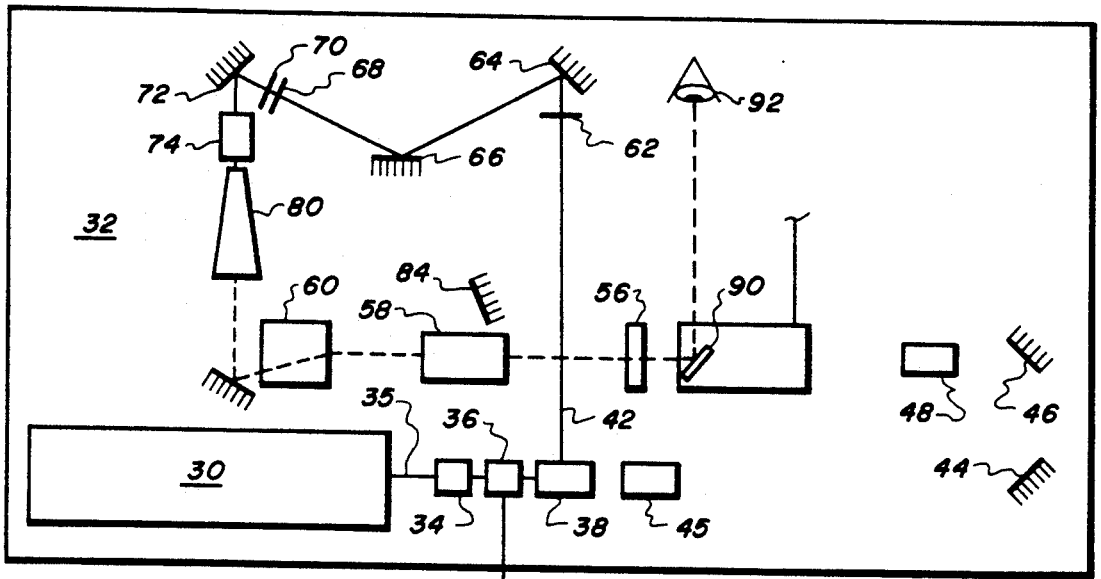
FIG. 6 is a semi-schematic diagram illustrating the configuration of optical components of a near-real-time holographic imaging system for viewing the hologram with electronic components omitted for clarity.

FIGS. 4 through 6 illustrates the components of the optical configuration for the holographic imaging system. FIG. 4 illustrates all components of the system while FIGS. 5 and 6 show the hologram generation and viewing component configurations respectively. In FIG. 6 the electronic components are omitted for clarity. The configuration is slightly modified depending on whether a hologram is being generated or is being viewed by the observer. FIG. 5 presents the optical configuration during hologram generation and FIG. 6 presents the optical configuration during observer viewing. In the generation mode, the configuration is arranged so that the object and reference beam wavefronts interfere at the front face of the holographic recording material, as is required for generation of a transmission hologram. In the viewing mode, the reference wavefront is transmitted through the rear of the recording material and travels in a reverse path through the optical system to reconstruct the original object wavefront. As previously mentioned, use of this technique in reconstruction provides for the elimination of image distortions induced by the optics during hologram generation.

An important factor in selecting an SLM for the system focused on its use as the holographic object source. The surface of the SLM selected is coated with a polarizer such that transmitted light is polarized at a 45° angle. Thus, to maximize the energy transmitted through to HRM (and thereby minimize exposure time), the object beam polarization was set to 45° before striking the SLM using a polarization rotator. Because of this adjustment, prior to interference of the object and reference beams at the front face of the recording material, it is necessary to adjust the polarization of the reference beam so that it matches the polarization of the object beam.

The system of FIGS. 4 to 6 uses a 2 watt argon laser 30, such as the Innova 90-3 of Coherent, Inc. of Palo Alto, Calif. to generate the object and reference beams. The optical system is mounted on a vibration isolating optical table 32 to provide isolation from vibrations during the holographic generation mode. Input Beam 35 is raised to the desired height on the optical system by beam riser 34 which is approximately 11 inches above the surface of the isolation table. Exposure is controlled by electronic shutter 36 to control the time of each exposure. The beam is then split by variable polarizing beam splitter 38 which splits the beam into a pair of mutually perpendicular beams 40 and 42.

Beam 40 forms the object wavefront and travels in the same direction as input beam 35. Beam 42 forms the reference wavefront and is redirected 90° to input source beam 35 and object beam 40. The optics of variable polarizing beam splitter 38 ensure that output beams 40 and 42 have the same polarization. The relative intensities of beams 40 and 42 are controlled by adjustment of variable polarizing beam splitter 38. By adjustment of variable polarizing beam splitter 38 it is possible to vary the object beam 40/reference beam 42 intensity ratio.

The orientation of object beam 40 is then changed by rotational polarizer 45 to a polarization of 45 degrees off-axis. Mirrors 44, 46 direct object beam 40 to spatial filter 48 and extends the path of the object beam so that object beam 40 and reference beam 42 are approximately equal. Spatial filter 48 receives object beam 40 and directs it through a 10 micrometer ($\mu$m) pinhole and a 10X objective. The pinhole of spatial filter 48 produces a point source of illumination. The pinhole is aligned with the 10X objective so that a uniform cone of expanding light is output to fully illuminate the holographic object source or SLM stack 50.

Three SLM stack 50 is mounted on micropositioning table 54 which may be model #106081520ELH, from Daedal Corp. of Harrison City, Pa. with a motor driver mode #AX 5751 of Compumotor Corp., Rohnert Park, Calif.

Micropositioning table 54, operated by tables positioning controller 55, selectively positions the three SLM stack 50 in sequential increments according to the depth planes used by commands from central computer controller 25. A diffuser 52 diffuses light reaching the transmissive object or SLM stack 50. Light transmitted through SLM stack 50 serves as the coherent light source for the hologram.

Fresnel field lens 56 forms the exit pupil of the system and images projection lens 58 to the viewing zone. Projection lens 58 is preferably a 100 mm focal length lens to relay the object wavefront onto holographic recording material (HRM) 60. The holographic recording material 60 should be near-real-time holographic material such as a Newport thermoplastic or DuPont photopolymer. A DuPont HRF-700 series photopolymer is preferable.

A half-wave plate 62 intercepts reference beam 42 and charges its polarization to match the polarization of object beam 40 which is off-axis at a 45 degree angle. Mirrors 64, 66 then direct reference beam 42 to polarizer 68 and extends the path length of reference beam 42 so that the object and reference beam paths are approximately equal. Polarizer 68 removes any light which is not polarized at a 45 degree angle with respect to vertical. Attenuator 70 follows polarizer 68 and is used to adjust the intensity of the reference beam when the K ratio is set.

Mirror 72 directs the reference beam 42 to spatial filter 74 that passes the reference beam through a 10 mm pinhole and a 20X objective. The pinhole produces a point source illumination aligned with the 20X objective. A uniform cone of expanding light is output to illuminate the entrance pupil of collimator 80. A collimated reference beam 42 is produced by collimator 80 that has an approximate 2 inch spot size. Mirror 82 directs collimated reference beam 42 to mirror 84 that in turn directs the reference beam to the holographic recording material 60. Mirror 82 is mounted on a kinematic base 86 that allows mirror 82 to be removed during the viewing mode. Mirror 88 is used during the viewing mode to direct reference beam 42 to holographic recording material 60 to reconstruct the object wavefront.

During the viewing mode an observer at 92 (FIG. 6) observes the full-parallax holographic 3-D image from mirror 90 that replaces SLM stack 50 and diffuser 52 during viewing mode. Mirror is substantially larger than the mirrors that direct the object beam 40 and reference beam 42 to holographic recording material 60. Mirror 90 will typically be 8"×11" while path length mirrors 44, 46, 64, 66, 68 and reference beam mirrors 82, 84 and 88 are 2" and 4" mirrors respectively.

During each exposure of the hologram generation mode, three 2-D depth planes are transmitted to 3-SLM stack 50 by projection TV controller 51 for simultaneous exposure onto the photopolymer holographic recording material (HRM) 60. HRM 60 is multiply exposed by 3-SLM stack 50 until all images are recorded. The hologram is then developed by exposure to ultraviolet light 65.

During the viewing mode, several components are removed including mirror 82 on kinematic mount 86, 3-SLM stack 50, and diffuser 52 as shown in FIG. 6. Mirror 90 is emplaced at the location where 3-SLM stack 50 was removed and is oriented at a 45° angle to the optical path. To reconstruct the hologram for viewing, the object beam 40 is blocked after exiting beam splitter 38. Because mirror 82 is removed, reference beam 42 reflects from mirror 88 onto the rear of transparent holographic recording material 60. The image is then transmitted through projection lens 58, Fresnel field lens 56, and is reflected from mirror 88 in the direction of observer 92. An automatic electro-mechanical system can be provided to speed up removing and inserting components during the generation and viewing modes as well as to advance a photopolymer film roll for the next holographic snapshot if desired.

Figure 7:
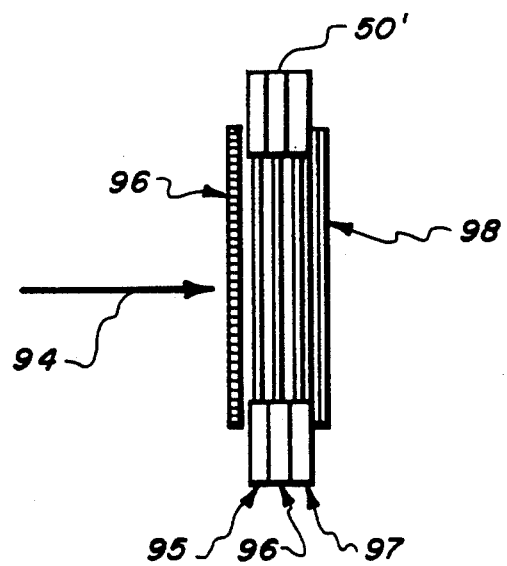
FIG. 7 is a side view of three spatial light modulators arranged in a stack.

To record the 2-D image planes comprising the remote site or object surfaces, HRM 60 (i.e., photopolymer) is multiply exposed. For each exposure of HRM 60, three 2-D images are recorded via use of SLM stack 50 of 3 SLM's. This multiplane-by-multiplane exposure process is repeated until all 2-D image planes are recorded. A side view of a typical 3-SLM stack is illustrated in FIG. 7. Object light beam 94 enters front polarizer 96 and is transmitted through 3-SLM stack 50' of SLM's 95, 96, 97 before reaching rear polarizer (or analyzer) 98. While the SLM housings 95, 96, 97 abut, the actual separation between the SLM units is about 0.1 inch (3 mm). Between exposures, 3-S-LM stack 50, mounted on micropositioning table 32, is repositioned in depth at a distance that corresponds to the real-world location of the images currently displayed on the SLM stack. That is, stack 50 is repositioned so that the images are recorded at the correct depth within the holographic volume. This move-display-expose cycle is repeated until the entire object volume is exposed on HRM 60.

Depending on how the SLM pixels are addressed, the final holographic image can consist of dark object surface points on a bright background (i.e., dark-on-bright option) or bright object surface points on a dark background (i.e., bright-on-dark option). For the dark-on-bright option, implementation is simple; surface points, or image-containing pixels (FIG. 3), are set to an opaque "dark" state while all other pixels are set to a transparent "bright" state. On the other hand, for the bright-on-dark option, transparent SLM pixels represent object surface points. Not all other pixels, however, are set to the opaque state. SLM pixels which are in front of or behind transparent image-containing pixels must also be open to allow light to be transmitted to and from the image-containing pixels. More specifically, image-containing pixels are set to their appropriate grey scale levels while pixels which must be transparent to allow the transmission of light are set to full open.

The bright-on-dark display method is preferred because non-image light from the dark-on-bright method can degrade the multiple exposure recording capability of HRM 60. In summary, in the 3-SLM stack, open SLM cells for a bright-on-dark image serve three purposes:

(1) Represent image information for a particular depth plane. Pixels where image information exists will be opened thereby creating a bright image on a dark background. These image-containing pixels, however, will not be set to full open. Instead, the cell is only opened wide enough to correspond to the grey scale value for that image point. Thus, depending on the specific grey scale value, image-containing pixels are set somewhere between full off and full on.

(2) Allow light to be transmitted to corresponding image-containing pixels on the SLMs that follow in the stack. These pixels are set to full open.

(3) Allow image information on preceding SLMs to be transmitted through the stack on the path to the holographic recording material. These pixels are also set to full open.

To implement the 3-SLM multiplane exposure technique, three Sharp SLMs (components of the SharpVision Projection System) are abutted against each other. An effort is made to align the individual pixel elements across the SLMs as closely as possible so that the honeycomb grid of electronic components is aligned. Furthermore, in order to implement the stacking method, it is necessary to invert the intensity of the image on one of the SLMs to account for variations in the polarization coatings among the three SLM units contained within the SharpVision Projection System. This adjustment allowed the light of the object beam to be transmitted through the entire SLM stack. The horizontal ordering of pixels was also inverted for one of the SLMs so that all three image planes were rectified.

Figure 8:
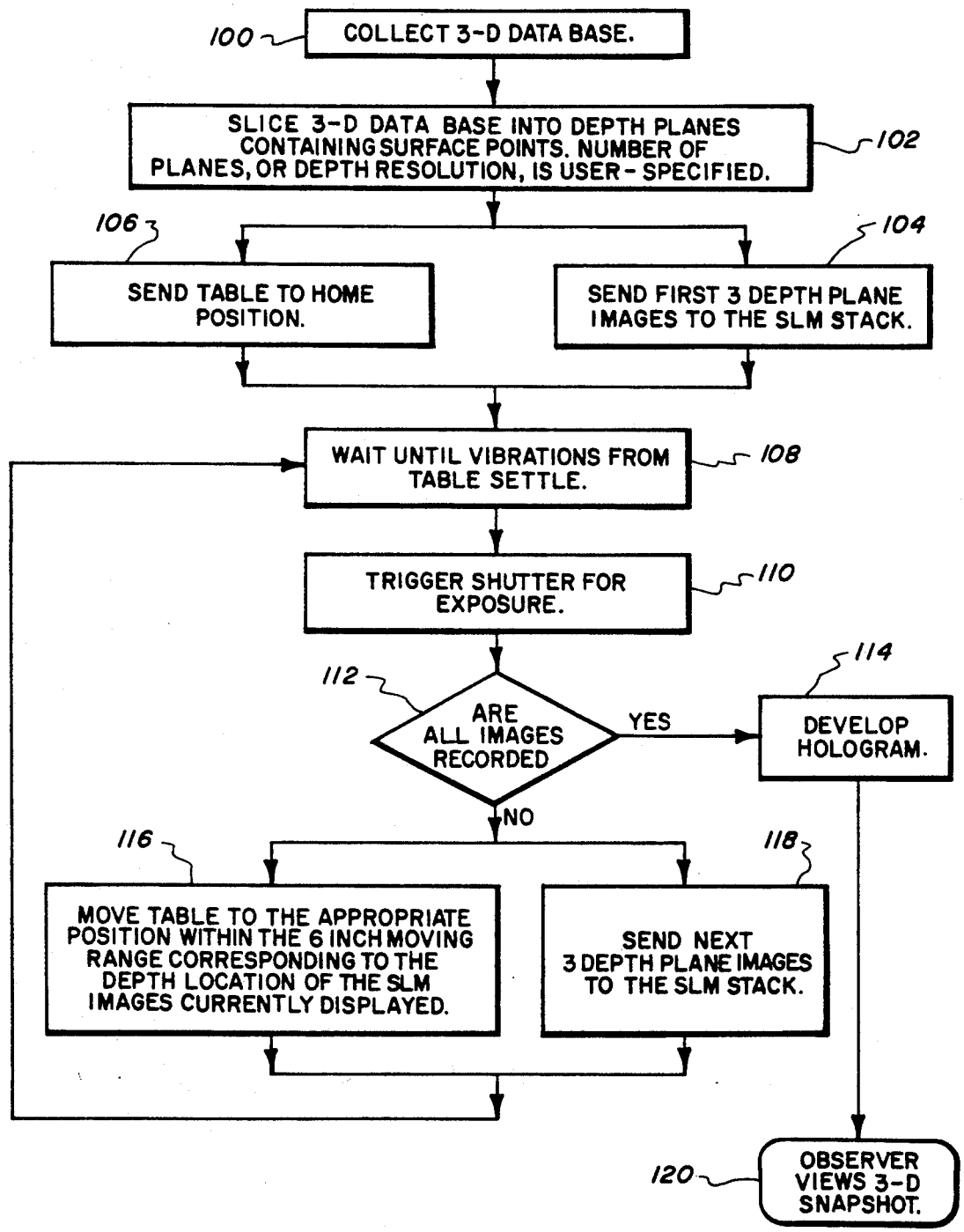
FIG. 8 is a software flow chart of the central computer control system operation for generating a holographic image.

FIG. 8 presents a flowchart of the process and functions performed by the central computer control system for generating a single holographic snapshot. Image data is collected into a 3-D data base 100 at the remote work site using laser range scanner 12' (FIG. 9b), the data volume is segmented at 102 into a series of 2-D planes. Each 2-D plane contains data compressed across a finite depth region. The number of 2-D depth planes used to represent the 3-D volume is specified by the user allowing for a variable depth resolution within the holographic display. The number of depth planes can be in the range of 20 to 80 depending on the resolution and speed desired.

Following image volume segmentation, the multiplane exposure process is initiated. The first set of three depth planes are transmitted at 104 (by projection TV controller 51) to the 3-SLM stack 50 and the micropositioning table 32 (FIG. 4-6) is sent to the home position 106 by positioning tables controller 55. Following a very brief time interval 108 (e.g. 1 sec or less) to settle any vibrations induced by micropositioning table 32 during the move of 3-SLM stack 50, laser shutter 36 is triggered at 110 by laser shutter controller 37. Following exposure of the first three depth planes, the next set of three planes is transmitted to 3-SLM stack 50 and the micropositioning table is moved at 116 to the depth location corresponding to the image set currently displayed on the SLMs. Again, after the brief vibration settle-time period 108, laser shutter 36 is triggered at 110 and the HRM is exposed with the new set of images. This multiplane, multiple exposure process continues until all depth plane images are recorded 112. When all images are recorded, the HRM is developed 114. In the case of photopolymer, development occurs instantly with an overhead UV bath.

After creation of the laser-range-scanner database, the database is segmented into a series of 2-D image planes before activating the SLM stack to create a hologram as follows. Referring to FIG. 9b laser range scanner 12' (Jupiter camera) is a line scanner that generates an array of 256 YZ points for a given X. To collect a three dimensional (3-D) database, laser range scanner 12' is repositioned by micropositioning table 143 to a new X location until all lines of interest are scanned. For each line scanned, laser range scanner 12' transmits the X value associated with the line, 256 Y points, 256 Z points, as well as the intensity for each YZ point to central processor 122 (FIG. 9a). The Y value can range from minus 128 to plus 128. The Z value or depth location, can range from 0 to 4096. The intensity can vary from 0 to 255. The values associated with each scanned line represents a two dimensional (2-D) cross section of the three dimensional (3-D), space. A sequence of 2-D cross sections, or line scans, comprises the 3-D numerical database needed by central computer controller 25 to create the holographic image.

Once collected and stored in central processor 122 the database is segmented into a set of XY depth planes for every possible Z value. The user has the option to skip specific XY planes on the original database or to use all information in the database. These selected XY planes planes are then processed to create a smaller number of XY planes equal to the number of SLM images to be recorded on the holographic recording material (HRM) 60 (FIGS. 4-6). Essentially each SLM image contains all surface points for a specific region of depth. That is, all XY planes in a specific region of depth are compressed onto one SLM image.

For example, assume a 4096 depth plane database is grouped into about 51 regions with approximately 80 depth planes assigned to each region. The 80 depth planes within each region are then compressed into one depth plane by projecting each XY plane in the region onto one XY plane. Each compressed depth plane contains surface points of the remote work site, and any object in the remote work site, for a given region of depth. The extent of this region defines the effective depth resolution of the holographic display. If the original depth planes in this database comprise a given six inch depth, and if the database is compressed into about 51 depth planes, the depth resolution of the final holographic display would be 0.1 inch (about 3 mm).

Each compressed depth plane is then electronically transmitted from central computer controller 25 to SLM stack 50 by projection TV controller 51 (FIGS. 4 and 5). When a depth plane is displayed on SLM stack 50 the open SLM pixels would visually display the surface points for that particular depth region. Specifically, three depth planes are transmitted to SLM stack 50 for a given exposure, one for each SLM in the stack. When the first set of three depth plane images are electronically transmitted from projection TV controller 51 to SLM stack 50, the SLM stack is positioned at the end extent of its travel via movement of micropositioning table 54 on which SLM stack 50 is mounted by positioning table controller 55. After a brief settle time (1 sec. or less) used to dissipate any vibrations induced by micropositioning table 54 movement, laser shutter 36 is triggered to open by laser shutter controller 37, laser light beam 35 is transmitted to SLM stack 50 and the image patterns on SLM stack 50 are exposed on HRM 60. Then the next set of three depth plane images are sent to SLM stack 50, SLM stack is appropriately positioned by positioning table controller 55, the settle time is invoked, laser shutter 36 is again triggered by laser shutter controller 37 and the new set of SLM stack images are exposed on HRM 60. This multiplane, multiple exposure process is repeated until all depth planes are recorded. When all depth planes are recorded photopolymer HRM 60 is developed by exposure to an ultraviolet light bath 65.

To view the hologram 120, several components are removed and a mirror is emplaced as shown in FIG. 6. To generate the next holographic snapshot, the configuration must be restored as shown in FIG. 5 and a new photopolymer film sheet must be emplaced. Electromechanical devices can be used to automate and speed up the process to initiate the UV bath, perform the component removal and emplacement during the generation and viewing modes, as well as to advance a photopolymer film roll if desired.

A Macintosh IIx (Mac-IIx) was selected as the central computer control system. The Mac-IIx utilizes a 68030 processor and a 68882 math co-processor, both running at 16 MHz. The unit is equipped with advanced graphics and special purpose communication boards.

The hardware architecture for the holographic imaging system is shown in FIG. 9a. Central processor 122 of the central computer control system is comprised of a Macintosh IIx 124 with a 1.44 MB 3.5 inch floppy drive from Apple Computer of Cupertino, Calif. The system included a 300 MB hard drive 126, and 60 MB tape back-up (not shown) with serial ports A, 128 and a second serial part B, 130. Inputs and outputs are controlled by I/O card 132 from National Instruments of Austin, Tex. A capture/display card 134 receives inputs from an Apple 8-bit display card 136 from Apple Computer and is used to display information on SLM stack 144 during hologram generation. Capture/display card 50 is preferably a NuVista 32 bit color image board from Truevision Inc., Indianapolis, Ind.

I/O card 132 handles handshaking operations between the Mac-IIx hardware and laser shutter 148 as well as between the Mac-IIx and Compumotor controller driver 140 that controls the position of microposiotioning table 142. Compumotor controller 140 is monitored by I/O card 132 in order to determine when table movement is complete. Laser shutter controller 146 is also strobed and sensed by the I/O card to determine when the exposure cycle is complete.

The Compumotor controllers are addressed by the Mac-IIx via the two RS-232C serial ports 128 and 130. The system software uses these serial ports to send commands to the controllers to move the table to various positions. As mentioned above, I/O card 132 is then used to verify the table has settled before continuing with operations. The additional Apple 8-bit color display card 136 is used as the main display card when capture/display card 134 is being used to generate SLM images.

Backups of system software and image databases are accomplished using the 60 MEG tape backup unit (not shown). The backups are stored to insure no data loss if any problems are experienced with 300 MEG hard drive 126.

Central processor 122 controls the inputs and outputs to operate shutter controller 146, shutter 148 of laser 30, composite RGB-to-composite-video converter 150 and projection system 152 as well as micropositioning table controller 140. The primary controller software is an interface program called FaceIt User Interface Software by Faceware, Inc., Urbana, Ill. that handles implementation of the high level user interface. This software is the main link between the user and lower level system computer controller.

Figure 10:
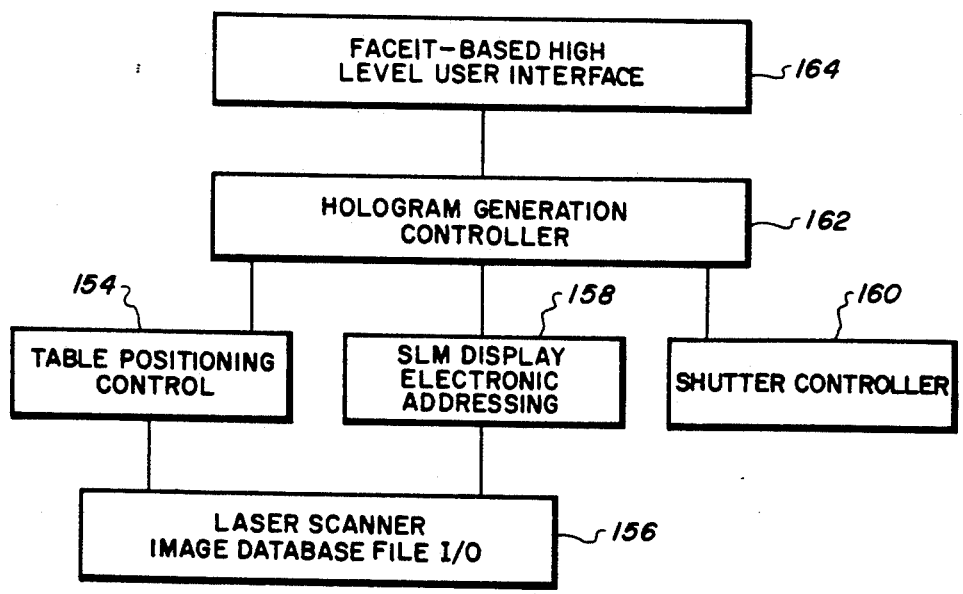
FIG. 10 is a block diagram of the holographic image system software architecture.

The interaction between the central processor and software elements are shown by the block diagram of FIG. 10. Micropositioning tables 142, 143 (FIG. 9) are controlled by a table positioning module 154 containing I/O routines necessary to move either of the two positioning tables to any supported position. Tables 142, 143 are controlled by sending serial commands from either serial ports 128, 130 available on the Mac-IIx. By sending command strings to the Compumotor table controllers 140, 141 the tables will move to the appropriate position. Feedback is provided from Compumotor controllers 140, 141 in the form of digital signals to indicate when a table move has been completed.

The system controller uses 3-D image data base 100 (FIG. 8) collected by remote laser range scanner 12' as the information data source for the hologram. Specific instructions regarding the generation of a hologram is entered by the user via a software interface (e.g. FaceIt) dialog box 164. This dialog box allows the user to specify information through hologram controller 162 related to the generation of the hologram such as the thickness of a depth slice and the number of image planes to be displayed. Following a command from the user to initiate the display generation process, a series of software routines 156, 158 transmit depth-plane images to the SLMs, to move the micropositioning table to the location that corresponds to the depth-plane images currently displayed, to wait about a one-second settle time so that any vibrations induced by the table motor will dissipate, and to trigger 158 laser electronic shutter 148 to open for exposure of the current depth-plane images onto the holographic recording material. Laser shutter duration is manually set on the Uniblitz electronic control box 37 manufactured by Vincent Associates, Inc., Rochester, N.Y.

When addressing the SharpVision SLMs, routines transmit image data from the NuVista video board to the SharpVision system via an RGB-to-composite-video converter 150. The data for three image slices are simultaneously transmitted—one image is transmitted on the RED signal, one on the BLUE, and another on the GREEN. The SharpVision system electronics transmit the appropriate image data to each monochromatic SLM in stack 144.

On each SLM of stack 144, pixels were closed if no information was present. Pixels containing image information were opened to the appropriate grey level; the corresponding pixels in the other SLMs were set to full open to allow light to strike an image-containing pixel or to allow the image information to be transmitted through to HRM 60 (FIGS. 4-6). The intensity of the image on one SLM was inverted to account for variations in the polarization coatings among the SLM units. This adjustment allowed the light of the object beam to be transmitted through open pixel cells in the entire SLM stack. The horizontal ordering of pixels was also inverted for one SLM so that the three image planes were rectified.

This invention is not to be limited by the embodiment shown in the drawings and described in the description which is given by way of example and not of limitation, but only in accordance with the scope of the appended claims.

What is claimed is:

1. A method of presenting a holographic display of a remote work site comprising;
   creating a database of three dimensional surface points of said remote work site;
   dividing said database into a plurality of two dimensional depth planes;
   exposing a near-real-time holographic recording material with each of said two dimensional depth planes;
   developing said holographic recording material to produce a full-parallax three-dimensional image of said remote work site;
   viewing said full-parallax three-dimensional image;
   whereby a near-real-time hologram image simulating natural vision is provided for remote manipulation of an object.

2. The method according to claim 1 in which said database is created by; scanning said remote work site with a laser range scanner; collecting the three dimensional surface points of said remote work site.

3. The method according to claim 2 in which said plurality of depth planes said database is divided into is between 20 and 80.

4. The method according to claim 2 in which said database is divided into depth planes of approximately 3 mm depth separation.

5. The method according to claim 1 in which said holographic recording material is exposed through one or more spatial light modulators.

6. The method according to claim 5 in which said holographic recording material is exposed through a plurality of spatial light modulators arranged in a stack.

7. The method according to claim 6 in which said holographic recording material is exposed through a stack of three spatial light modulators.

8. The method according to claim 7 in which said holographic material is exposed simultaneously with groups of two dimensional depth planes.

9. The method according to claim 8 in which said holographic material is sequentially exposed simultaneously with said groups of two dimensional depth planes until all depth planes have been used.

10. The method according to claim 9 in which said holographic recording material is exposed through a stack of spatial light modulators mounted on a micropositioning table; said stack of spatial light modulators being repositioned after each multiple exposure.

11. The method according to claim 6 in which said developed holographic image is viewed by replacing said stack of spatial light modulators with a mirror.

12. The method according to claim 1 in which said holographic material is a thermoplastic holographic recording material.

13. The method according to claim 1 in which said holographic material is a photopolymer holographic material.

14. The method according to claim 13 in which said photopolymer holographic recording material is developed by illuminating the holographic recording material with ultraviolet light.

15. A system for presenting a holographic display of a remote work site in near-real-time comprising;
    database creating means for creating a three dimensional database of a remote worksite;
    dividing means dividing said database in a plurality of two dimensional depth planes;
    holographic recording means;
    exposing means for exposing said holographic recording means to said plurality of two dimensional depth planes;
    developing means for developing said holographic recording means to produce a holographic image of said remote work site;
    viewing means for viewing said holographic image;
    whereby a near-real-time holographic image of said remote work site may be viewed for remote manipulation of an object.

16. The system according to claim 15 in which said database creating means comprises; laser range scanning means for scanning said remote work site to collect three dimensional numerical data representing said remote work site.

17. The system according to claim 16 in which said laser range scanner is mounted on a micropositioning table for scanning said remote work site and sequentially repositioning said micropositioning table to move said laser range scanner after each scan.

18. The system according to claim 15 in which said exposing means comprises one or more spatial light modulators; one or more of said two dimensional depth planes being applied to said one or more spatial light modulators; whereby said one or more spatial light modulators act as a holographic object source.

19. The system according to claim 18 in which said one or more spatial light modulators is three spatial modulators in abutting relationship forming a stack.

20. The system according to claim 19 in which said two dimensional depth planes are sequentially applied in groups of three, one each to each spatial light modulator in said stack until said holographic recording material has been exposed to all two dimensional depth planes.

21. The system according to claim 19 including a micropositioning table; said stack of three spatial light modulators being mounted on said micropositioning table for repositioning after being exposed to each group of two dimensional depth planes.

22. The system according to claim 15 in which said holographic recording material is a thermoplastic holographic recording material.

23. The system according to claim 15 in which said holographic recording material is a photopolymer holographic recording material.

24. The system according to claim 23 in which said photopolymer recording material is developed by illuminating the photopolymer holographic recording material with ultraviolet light.

25. The system according to claim 15 in which said database is divided into segments that provide two dimensional depth planes representing approximately 3 mm in depth.

26. The system according to claim 15 in which said database is divided into segments that provide between 20 and 80 two dimensional depth planes.

27. The system according to claim 15 in which said developed holographic image is viewed by replacing said means for exposing said holographic recording material with a mirror.

28. The system according to claim 15 in which said laser range scanner is mounted on a micropositioning table for repositioning after each scan.

* * * * *